US010526815B2

(12) United States Patent
Gillespie

(10) Patent No.: US 10,526,815 B2
(45) Date of Patent: Jan. 7, 2020

(54) MOUNTING ASSEMBLY

(71) Applicant: Gingers Spark Ltd, Cheshire (GB)

(72) Inventor: Michael Paul Gillespie, Cheshire (GB)

(73) Assignee: Gingers Spark Ltd., Stockport (GB)

( * ) Notice: Subject to any disclaimer, the term of this patent is extended or adjusted under 35 U.S.C. 154(b) by 643 days.

(21) Appl. No.: 15/306,414

(22) PCT Filed: Feb. 19, 2015

(86) PCT No.: PCT/GB2015/050477
§ 371 (c)(1),
(2) Date: Oct. 24, 2016

(87) PCT Pub. No.: WO2015/124929
PCT Pub. Date: Aug. 27, 2015

(65) Prior Publication Data
US 2017/0107741 A1 Apr. 20, 2017

(30) Foreign Application Priority Data
Feb. 19, 2014 (GB) .................................. 1402901.1

(51) Int. Cl.
*E05C 19/16* (2006.01)
*E05B 47/00* (2006.01)
(Continued)

(52) U.S. Cl.
CPC ............ *E05B 47/0047* (2013.01); *E05B 9/08* (2013.01); *E05C 7/00* (2013.01); *E05C 19/166* (2013.01); *E05C 7/04* (2013.01); *Y10T 292/11* (2015.04)

(58) Field of Classification Search
CPC ..... E05B 7/00; E05B 7/04; E05B 9/08; Y10T 292/1099; Y10T 292/11; Y10T 292/426;
(Continued)

(56) References Cited

U.S. PATENT DOCUMENTS 2,867,467 A * 1/1959 Foley ...................... E05C 19/16 292/251.5
2,904,364 A * 9/1959 Korodi .................... E05C 19/16 292/251.5
(Continued)

FOREIGN PATENT DOCUMENTS

FR 1298999 A * 7/1962 ............. E05C 19/16
FR 2763630 A3 * 11/1998 ......... E05B 65/0025
(Continued)

OTHER PUBLICATIONS

International Preliminary Report on Patentability for International Application No. PCT/GB2015/050477, dated Jun. 15, 2015, 4 Pages.
(Continued)

*Primary Examiner* — Carlos Lugo
(74) *Attorney, Agent, or Firm* — Richard A. Castellano; DNL Zito Castellano

(57) ABSTRACT

A mounting assembly (10) for the electromagnet (12) of an electromagnetic door locking system, the mounting assembly (10) comprising: a main body portion (14) affixable, in use, to a door frame (18), the main body portion (14) comprising at least two channels adapted to receive a corresponding set of tabs associated with the electromagnet (12) and a set of locking screws (30) cooperating with the channels and being adapted, upon tightening, to deform the channels to clamp the tabs to fix the electromagnet (12) relative to the main body portion (14).

20 Claims, 5 Drawing Sheets

(51) Int. Cl.
*E05B 9/08* (2006.01)
*E05C 7/00* (2006.01)
*E05C 7/04* (2006.01)

(58) Field of Classification Search
CPC ...... E05C 19/16; E05C 19/166; Y10S 292/53; Y10S 292/54
USPC ............ 248/220.21, 220.22, 221.11, 221.12, 248/224.8, 22.41, 223.21, 225.1, 1, 309.1
See application file for complete search history.

(56) References Cited

U.S. PATENT DOCUMENTS

| | | | | | |
|---|---|---|---|---|---|
| 2,983,538 | A * | 5/1961 | Fletcher | E05C 19/16 | 292/251.5 |
| 3,164,354 | A * | 1/1965 | Murdock | E04F 11/1804 | 248/229.1 |
| 3,331,043 | A * | 7/1967 | Orzabal | E05C 19/16 | 292/251.5 |
| 3,544,072 | A * | 12/1970 | Thom | E04F 11/1804 | 256/59 |
| 4,219,067 | A * | 8/1980 | Hurst | E05F 7/04 | 16/404 |
| 4,981,312 | A * | 1/1991 | Frolov | E05C 19/168 | 248/27.1 |
| 5,000,497 | A * | 3/1991 | Geringer | E05C 19/168 | 292/144 |
| 5,133,581 | A | 7/1992 | Coleman | | |
| 5,184,854 | A | 2/1993 | Chen | | |
| 5,184,856 | A * | 2/1993 | Waltz | E05C 19/168 | 292/144 |
| 5,376,910 | A * | 12/1994 | Geringer | E05C 19/166 | 292/251.5 |
| 5,516,166 | A * | 5/1996 | Frolov | E05C 19/166 | 292/251.5 |
| 6,053,546 | A * | 4/2000 | Frolov | E05C 19/166 | 292/144 |
| 6,470,629 | B1 * | 10/2002 | Haddock | E04D 13/10 | 248/200 |
| 6,609,738 | B1 | 8/2003 | Roth et al. | | |
| 7,481,407 | B2 * | 1/2009 | Kim | B60G 17/019 | 180/282 |
| 7,699,278 | B2 * | 4/2010 | Goldstein | A47H 1/02 | 248/220.21 |
| 7,770,947 | B2 * | 8/2010 | Huang | E05C 19/168 | 292/251.5 |
| 8,407,895 | B2 * | 4/2013 | Hartelius | F24S 25/12 | 29/890.033 |
| 8,534,637 | B2 * | 9/2013 | Kuo | H05K 7/142 | 248/500 |
| 9,617,768 | B2 * | 4/2017 | Benhammou | E05C 19/166 | |
| 2008/0094158 | A1 | 4/2008 | Schmid | | |
| 2010/0230979 | A1 * | 9/2010 | Gries | E05C 19/16 | 292/251.5 |
| 2012/0199711 | A1 * | 8/2012 | Tsai | F16M 11/14 | 248/220.22 |
| 2015/0211271 | A1 * | 7/2015 | Benhammou | E05C 19/166 | 292/251.5 |

FOREIGN PATENT DOCUMENTS

| | | | | |
|---|---|---|---|---|
| FR | 2945830 | A3 * | 11/2010 | E05C 19/166 |
| FR | 2980508 | A1 | 3/2013 | |
| GB | 2431432 | A | 4/2007 | |
| GB | 2516710 | B | 9/2016 | |
| WO | 2015124929 | A1 | 8/2015 | |

OTHER PUBLICATIONS

Written Opinion of the International Searching Authority for International Application No. PCT/GB2015/050477, dated Jun. 15, 2015, 6 Pages.
Notification of Transmittal for corresponding International Application No. PCT/GB2015/050477, dated Jun. 15, 2016, 1 Page.
Notification of Transmittal of Translation of the International Preliminary Report on Patentability (Chapter I) or International Application No. PCT/GB2015/050477, dated Sep. 1, 2016, 3 Pages.
U.K. Office Action for related U.K. Patent Application No. GB1402901.1 dated Aug. 13, 2014, 3 Pages.

* cited by examiner

MOUNTING ASSEMBLY

RELATED APPLICATION DATA

This application is a U.S. National Phase Patent Application of PCT/GB2015/050477, filed Feb. 19, 2015, titled MOUNTING ASSEMBLY, which claims the benefit of GB Patent Application No. 1402901.1, filed Feb 19, 2014, titled MOUNTING ASSEMBLY, to which this application claims the benefit of priority, and the disclosures of which are hereby incorporated by reference herein in their entireties.

This invention relates to mounting assemblies for door locks and in particular, but without limitation, to mounting assemblies for electromagnetic door locks suitable for use in buildings.

In many buildings nowadays, it is commonplace to provide doors with electronic/automatically controlled locking systems that enable doors to be selectively locked or unlocked from a remote location. One known type of door lock comprises a metal plate (often of manufactured of steel or some other ferromagnetic material), which is affixed to the door and a corresponding electromagnet assembly, which is affixed to the door frame adjacent the metal plate when the door is closed. By energising or de-energising the electromagnet, the door can be locked, or unlocked, by magnetic attraction between the electromagnet and the metal plate.

Electromagnetic door locking systems are often integrated into security access systems, such as a smart card or an RFID reader, which is located adjacent the doorway. By such an arrangement, a user can approach the doorway, swipe or touch his/her card against the reader to unlock the door by de-energising the electromagnet, thus allowing the door to the open freely. After an interval of time has elapsed, usually a few seconds, the electromagnet is re-energised such that when the door re-closes, it is locked in the closed position by electromagnetic attraction. Such systems can be used to control the use of doors on an individual basis, but more commonly, and especially in larger buildings and public spaces, such systems are integrated into networks to enable the locking and unlocking of doors to be effected individually, or in groups, from a remote location, such as from a security control room.

The installation of electromagnetic door locks is often preceded by the installation of the door and frame. As such, in the vast majority of cases, the fitting of the electromagnetic lock and its associated equipment is a retrofitting activity, which takes place either at the time of constructing a building, all subsequently thereto (for example during an upgrade).

In order for an electromagnetic door locking system to operate correctly, it is necessary for the electromagnet and the corresponding metal plate to the correctly aligned. This usually involves installing the electromagnet unit on the door frame first, and then aligning the metal plate on the door subsequently. In order to achieve correct alignment, it is often necessary to use shims to position the metal plate as close as possible to the electromagnet when the door is in a closed position. During initial installation, this can, in the case of wooden doors and wooden door frames, be relatively straightforward, albeit a meticulous process. Nevertheless, it is generally a skilled job to correctly install an electromagnetic door locking system—even to a wooden door/doorframe assembly.

The process of installing electromagnetic door locks is complicated, however, when such a system is required to be fitted to a door or doorframe manufactured from extruded and/or hollow components, such as is commonly the case with uPVC door installations or aluminium door frames. Hollow doorframes provide a significant advantage from an aesthetic point of view because the associated wiring for the electromagnet can be routed through the hollow interior of the frame thereby conceding them from view. However, because it is not possible to chisel/modify the shape of the frame significantly to fit the electromagnet in the correct position, it is often more difficult with a hollow-section doorframe, to correctly position and configure electromagnetic door lock system. In other words, the options for positioning and/or repositioning the electromagnet are somewhat limited when used with a hollow doorframe.

A further problem exists in the art as well inasmuch as certain doorframe configurations, especially those in which the door is set back from the face of the frame, give rise to significant installation problems because it becomes very difficult, without the use of shims and spacers, to position the metal plate on the door sufficiently close to the electromagnet to enable it to operate correctly.

Furthermore, a yet further problem exists when a door needs to be maintained. In particular, if the door needs to be re-hung, changed or otherwise adapted: when the door is re-hung, it is often the case that the modification/maintenance work has introduced errors in the alignment of the metal plate of electromagnetic lock relative to the electromagnet. Therefore, whilst an electromagnetic door locking system may have been correctly installed in the first instance, subsequent maintenance work on the door (for example decorating, lock changing, etc.) can give rise to misalignment, which can adversely affect the performance and/or operation of electromagnetic door lock.

As previously stated, the only practical solution to the above problems that exists in the market at present involves the use of shims and/or spacers, which can be interposed between the electromagnet arrangement and doorframe, and/or between the metal plate on the door and the door itself. Whilst such solutions have been found, in the past, to provide an adequate solution to the problem of misalignment, the installation of the shims and repositioning of the elements of the system tends to be a fiddly and time-consuming process, which is inefficient, undesirable, and can significantly increase installation/maintenance costs. And need therefore exists for a solution to one or more of the above problems and this invention aims to provide such a solution in certain embodiments.

According to a first aspect of the invention, there is provided a mounting assembly for the electromagnet of an electromagnetic door locking system, the mounting assembly comprising: a main body portion affixable, in use, to a door frame, the main body portion comprising at least two channels adapted to receive a corresponding set of tabs associated with the electromagnet and a set of locking screws cooperating with the channels and being adapted, upon tightening, to deform the channels or tabs to clamp them to fix the electromagnet relative to the main body portion.

According to a second aspect of the invention, there is provided a mounting assembly for the electromagnet of an electromagnetic door locking system, the mounting assembly comprising: a main body portion affixable, in use, to a door, the main body portion comprising at least two channels adapted to receive a corresponding set of tabs associated with the electromagnet and a set of locking screws cooperating with the channels and being adapted, upon tightening, to deform the channels or tabs to clamp them to fix the electromagnet relative to the main body portion.

Suitably, the main body portion is affixable, in use, to the door or door frame using screws that extend through apertures in the main body portion.

Suitably, the main body portion comprises a hollow interior portion, or a cavity, and suitably arranged access apertures to permit cabling for the electromagnet to be routed discretely within the mounting assembly and/or the door or door frame. The main body portion suitably comprises a set of cut-outs or apertures to enable the electromagnet's cabling to be routed from within the hollow interior portion or cavity into the door or door frame.

The main body portion suitably has a constant cross-section, i.e. it can be manufactured via an extrusion process, such that it can be cut to length to accommodate a range of different electromagnets.

The channels are suitably provided in a pair of slider plate receivers, which can be mounted on the main body portion. The slider plate receivers are suitably adapted to slideably receive the opposite ends of a slider plate, to which the electromagnet is affixed.

The sliding plate receivers, where provided, are suitably fitted onto the opposite ends of the main body portion. The sliding plate receivers may have a constant cross-section, i.e. they can be manufactured via an extrusion process, which reduces manufacturing costs and enables the same type of extrusion to be cut to different lengths to fit different sized main body portions.

The sliding plate receivers may each comprise a first channel adapted to accommodate one or more captive nuts that engage, in use, with the shanks of a set of retaining screws that extend through a corresponding set of through apertures of the main body portion. Thus, the sliding plate receivers can be screwed to the opposite ends of the main body portion thereby closing off the ends of the main body portion to form a hollow receiving space for accommodating the cabling of the electromagnet.

Suitably, the sliding plate receivers, where provided, comprise a slider plate receiving channel, which is shaped and sized to accommodate the tabs, or the end of a slider plate at a location slightly below the lower edges the main body portion, such that the slider plate can slide relative to the underside of the main body portion.

Suitably, a slider plate may be provided to which the electromagnet is affixable, in use. The slider plate is suitably manufactured from a cut sheet of metal, such as steel or aluminium, and has a generally rectangular shape whose length corresponds to the distance between the inner edges of the channels. The width of the slider plate suitably corresponds to the dimensions of the electromagnet and/or to the width of the main body portion, although the width of the slider plate is not critical.

The electromagnet can be affixed to the slider plate using screws such that the electromagnet is suspended beneath the slider plate. The slider plate suitably comprises an aperture through aperture, in use, the cabling for the electromagnet can pass into a cavity within the main body portion.

The tabs or the ends of the slider plate suitably comprise a pair of U-shaped cut-outs that ideally intersect the ends thereof. Such a configuration allows the tables or slider plate to move relative to the channels.

The locking screws suitably engage with a tapped orifice of the mounting assembly, which, in an embodiment of the invention, may be a captive nut retained within a captive channel of the main body portion or the sliding plate receivers.

The channels suitably comprise ribbing to enhance the gripping of the tabs or slider plate upon tightening the locking screws.

The deformation of the channels is preferably elastic deformation.

A third aspect of the invention provides a kit of parts comprising a main body portion, a pair of slider plate receivers adapted to fit the main body portion as described herein, and an electromagnet comprising tabs adapted to engage, in use, the channels of the slider plate receivers. Suitably, a slider plate as described herein may also be included in the kit, which is affixable to the electromagnet of the kit.

A fourth aspect of the invention provides an electromagnet comprising a set of tabs adapted to engage, in use, the channels of a mounting assembly described herein.

Preferred embodiments of the invention shall now be described, by way of example only, with reference to the accompanying drawings in which.

Figure 1:
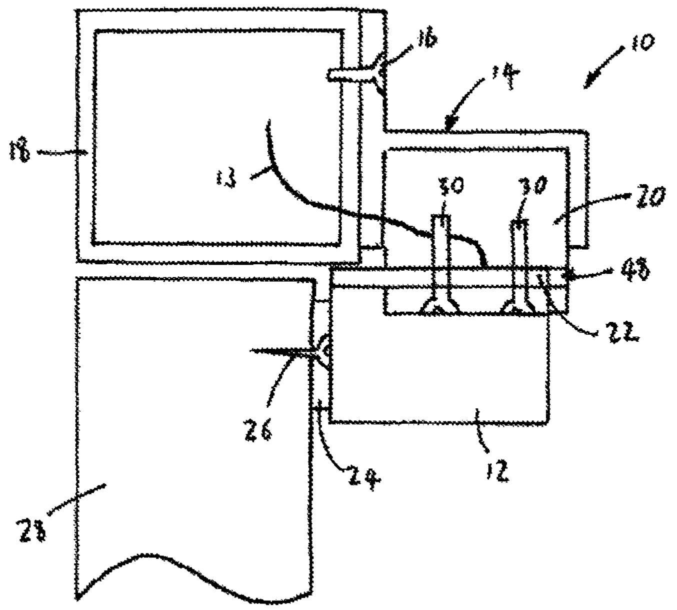
FIG. 1 is a schematic cross-section through an embodiment of an adjustable mounting assembly according to the invention.
Figure 11:
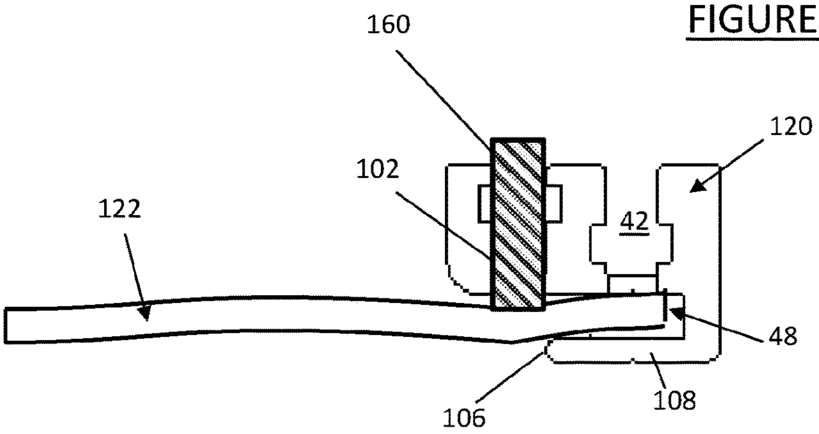
FIG. 11 is a first schematic cross-section showing the deflection of the sliding plate under the influence of locking screws.
Figure 11A:
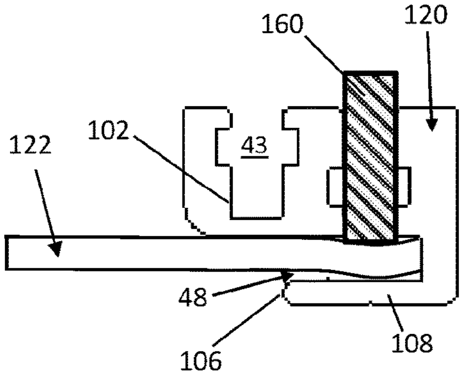
Figure 12:
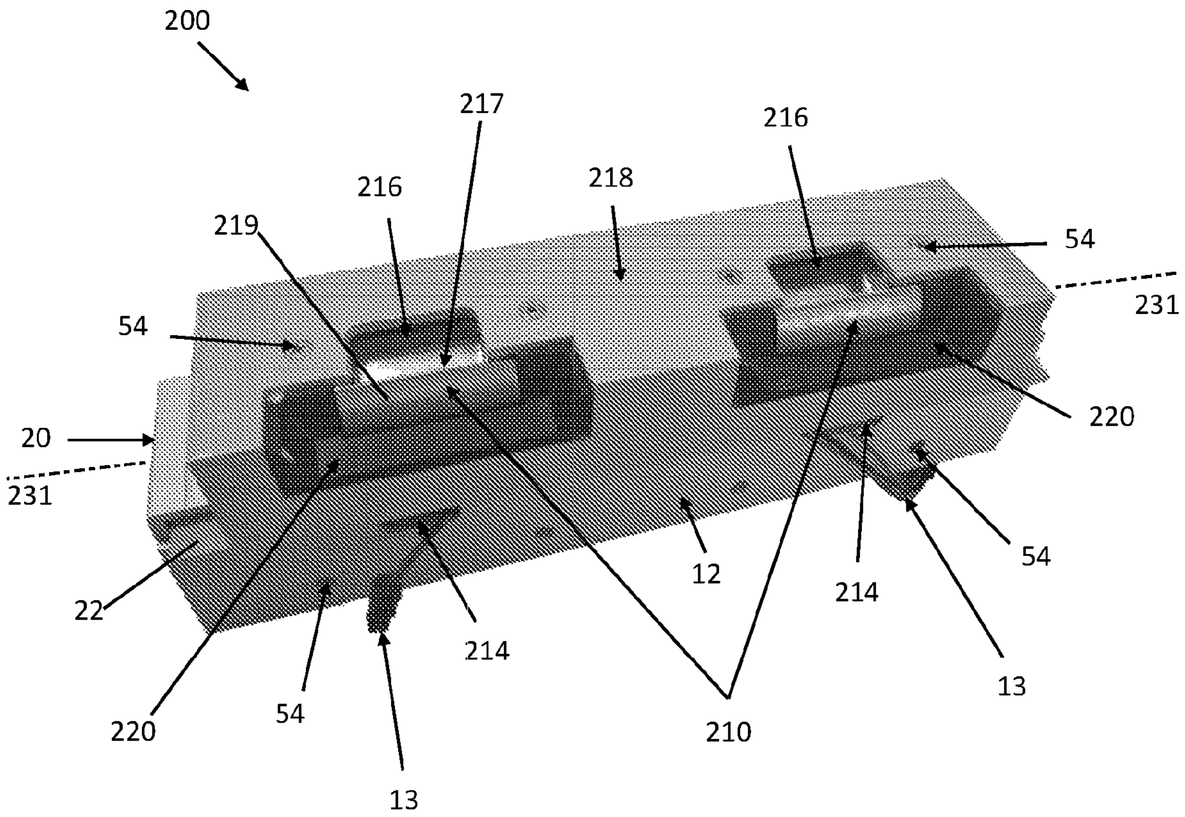

FIG. 11A is a second schematic cross-section showing the deflection of the sliding plate under the influence of locking screws; and FIG. 12 is a perspective view of an electric magnetic striker FIG. 1 summarises the invention, and illustrates an embodiment thereof in which an adjustable mounting assembly 10 for the electromagnet 12 of a magnetic door lock is shown. The adjustable mounting assembly 10 comprises a main body portion 14 that is screwed 16 to the head of a door frame 18. A pair of slider plate receivers 20 is mounted on the main body portion 12, which are adapted to slideably receive opposite ends of a slider plate 22, to which the electromagnet 12 is affixed. The slider plate 22 is slideable relative to the slider plate receivers 20 thus permitting post-installation adjustment. Such a configuration enables the electromagnet 12 can be positioned and/or re-positioned close to, or in contact with, a ferromagnetic plate 24 screwed 26 to a door 28. Locking screws 30 are also provided to clamp the ends of the slider plate 22 to the slider plate receivers 20 to inhibit and/or prevent subsequent movement of the electromagnet 12 relative to the door 28 or its ferromagnetic plate 24. A cavity is formed in the main body portion 14, and by providing suitable access apertures (described below), cabling 13 for the electromagnet 12 can be routed discretely within the mounting assembly 10 and the door frame 18.

Figure 2:
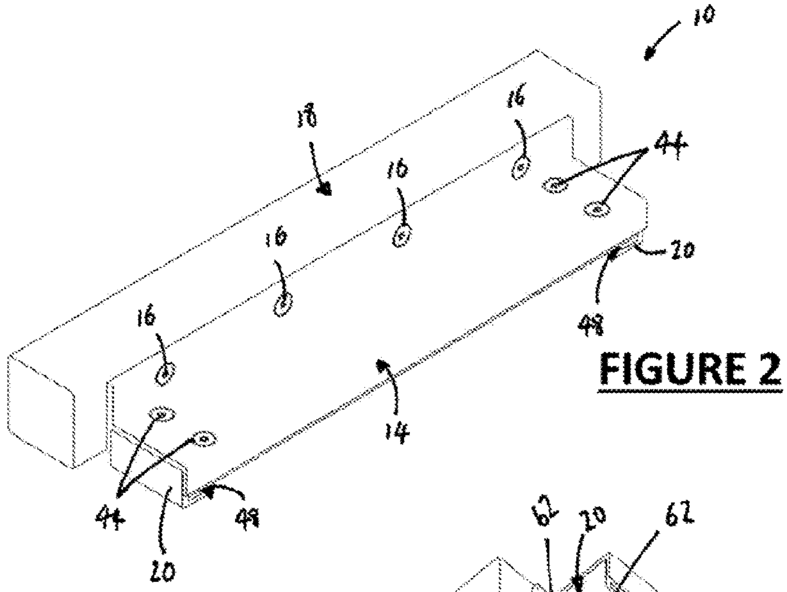
FIG. 2 is a perspective view from above of an embodiment of a mounting system for a magnetic door lock in accordance with the invention.
Figure 3:
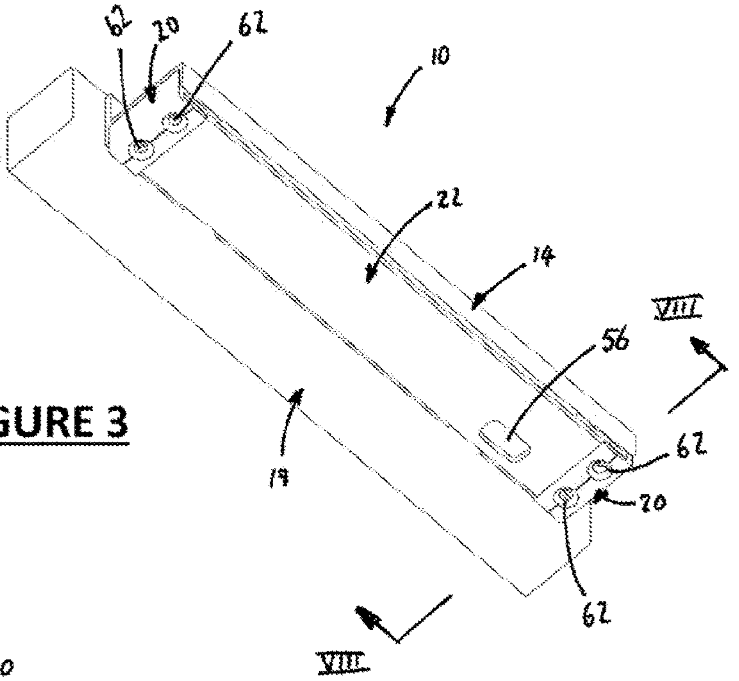
FIG. 3 is a perspective view from below of the arrangement shown in FIG. 2 with a slider plate fitted.
Figure 4:
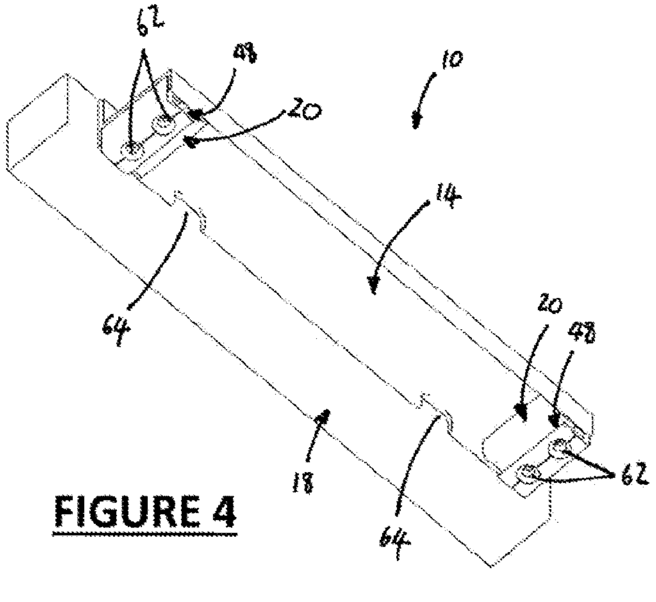
FIG. 4 is a perspective view from below of the embodiment shown in FIG. 3, without the slider plate.
Figure 5:
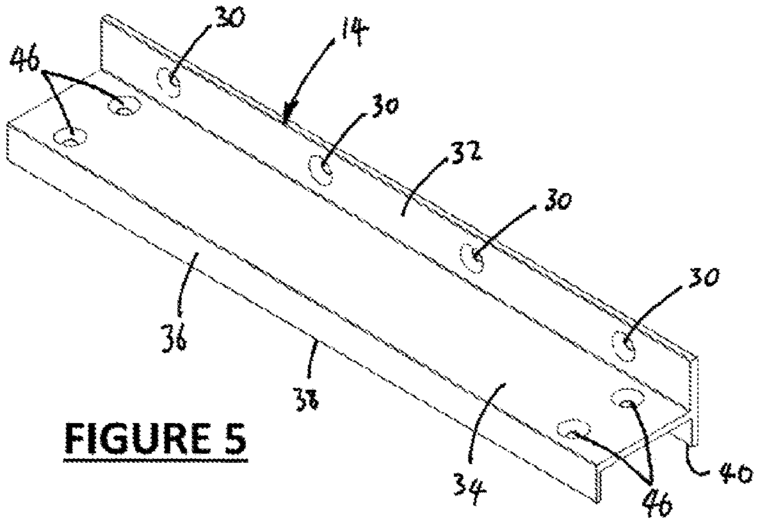
FIG. 5 is a perspective view of the main body portion shown in FIGS. 2, 3 and 4.

In FIGS. 2, 3 and 4, and with particular reference to FIG. 5, the adjustable mounting assembly 10 comprises a main body portion 14 that is affixable, in use, to a door frame member 18 (in the illustrated embodiment, a horizontal door frame head) using screws 16, which pass through a set of through apertures 30 in a planar mounting wall portion 32 of the main body portion 14. It will be noted that the main body portion 14 has a constant cross-section, i.e. it is manufactured via an extrusion process, and can therefore be cut to length to accommodate a range of different electromagnets (not shown).

Extending perpendicularly outwardly from the mounting wall portion 32, and away from the door frame 18, is a lateral body portion 34, which has at its distal end from the mounting wall portion 32, a perpendicularly extending, downward return portion 36, whose free end 38 terminates level with the lower edge 40 of the mounting wall portion 32. The main body portion 14 thus has a generally h-shaped cross-section and is cut to an appropriate length to match the length of an electromagnet assembly (not shown for clarity).

Figure 6:
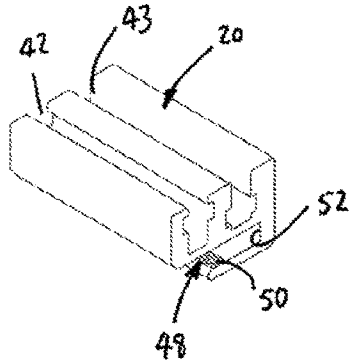
FIG. 6 is a perspective view of a sliding plate receiver as shown in FIGS. 2, 3 and 4.

A pair of sliding plate receivers 20, as shown particularly in FIG. 6, is fitted onto the opposite ends of the main body portion 14, as shown in FIGS. 2, 3 and 4. The sliding plate receivers 20 also have a constant cross-section, i.e. they are manufactured via an extrusion process, which reduces manufacturing costs and enables the same type of extrusion to be cut to different lengths to fit different sized main body portions 12. In other words, the length of the sliding plate receivers 20 can be cut to match the lateral body portion 34, or the distance between the mounting wall portion 32 and the downward return portion 36 of the main body portion 14.

The sliding plate receivers 20 each comprise a pair of channels 42, 43 adapted to accommodate captive nuts (not shown). A first one 42 of the channels carries captive nuts that engage, in use, with the shanks of a set of retaining screws 44 that extend through a corresponding set of through apertures 46 located in the lateral body portion 34, of the main body portion 14 (as shown in FIGS. 2 and 5 in particular). The function of the other channel 43 is described below. Thus, the sliding plate receivers 20 can be screwed to the opposite ends of the main body portion 14 to close off the ends of the main body portion, thereby forming a hollow receiving space (or cavity when the slider plate 22 is fitted) for accommodating the cabling of the electromagnet 12.

The sliding plate receivers 20 each additionally comprise a slider plate receiving channel 48, which is shaped and sized to accommodate an end of the slider plate 22 at a location slightly below the lower edges 36, 40 of the main body portion 14, so that the slider plate 22 can slide relative to the underside of the main body portion 14.

Figure 7:
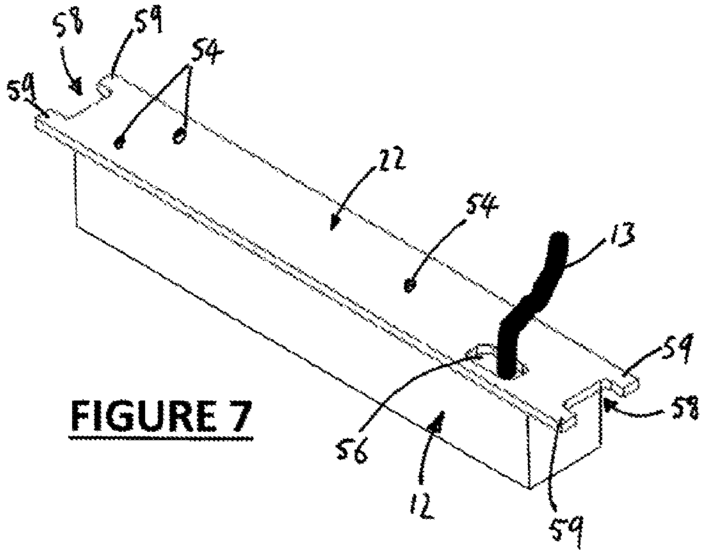
FIG. 7 is a perspective view of a sliding plate as shown in FIG. 3.

The slider plate 22, as shown in FIG. 7 in particular, is manufactured from a cut sheet of metal, such as steel, and has a generally rectangular shape whose length corresponds to the distance between the inner edges 52 of the slider plate receiving channels 48, and whose width corresponds to the dimensions of the electromagnet 12 and/or to the width of the main body portion 14, although the width of the slider plate 22 is not critical.

The electromagnet 12 is affixed to the slider plate 22 using screws 54 such that the electromagnet 12 is suspended beneath the slider plate 22. It will be noted that the slider plate 22 as a slotted through aperture 56 through which, in use, the cabling 13 for the electromagnet 12 can pass into the cavity within the main body portion 14, as previously described.

Figure 8:
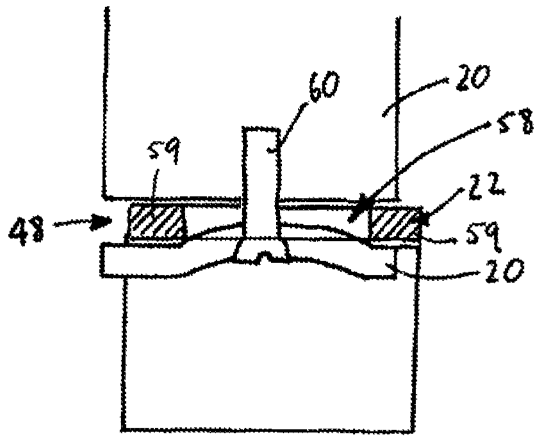
FIG. 8 is a schematic cross-section of FIG. 3 on VIII-VIII.

The slider plate 22 additionally comprises a pair of U-shaped cut-outs 58 that intersect the end edges thereof and this allows the slider plate to move relative to the slider plate receivers 20, as shall be described below. Referring back to FIG. 6, the slider plate receivers 20 comprise a channel 43 adapted to accommodate a pair of captive nuts (not shown). Referring now to FIG. 8, a pair of screws 60 extend through a corresponding set of apertures 62 in the underside of the slider plate receivers 20, the shanks of which screws 60 pass through the U-shaped cut-outs 58 at the ends of the slider plate 22. By tightening the screws 60, slider plate receiving channel 48 can be deformed (as shown exaggeratedly in FIG. 8) to grip the slider plate 22 in a fixed position relative to the slider plate receivers 20. The gripping is further facilitated by the provision of ribbing 50 formed within the slider plate receiving channel 48. The deformation can be plastic or elastic, although elastic deformation is preferred as it allows the slider plate receiving channel 48 to return to its original configuration, thus releasing the slider plate 22 and allowing it to be re-positioned, when the screws 60 are loosened off.

It will be appreciated that because the slider plate is gipped independently from its opposite ends, a range of movement of the slider plate 22, and hence the electromagnet 12, is possible using the invention, including sliding parallel or skewed, towards and/or away from the door 28. It will also be appreciated that the electromagnet 12 can even be mounted below the door frame 18 head, in the illustrated embodiment, using the invention, to align with the plate 24 of a rebated door.

In FIG. 4 it can also be seen that the main body portion 12 comprises a set of cut-outs 64 to enable the electromagnet's cabling 13 to extend invisibly (from the exterior of the device 10) into the door frame 18.

Suitably, the main body portion 14 and slider plate receivers 20 are manufactured from aluminium extrusions for ease of manufacture and to reduce the weight of the device 10, although the choice of material is largely a matter of preference. The slider plate 22 is suitably manufactured via a CNC or laser cutting process, although this too is a matter of preference and economy of scale.

Suitably, the invention is provided in kit form, i.e. a kit comprising a main body portion 14, a pair of slider plate receivers 20 adapted to fit the main body portion 14, and a slider plate 22 adapted to match a given electromagnet. Suitably, the kit may additionally comprise an electromagnet 12, which may be pre-fitted, or factory-fitted to the slider plate 22, although this is optional, and/or a set of screws to complete the assembly. The kit may also comprise a ferromagnetic plate.

In another embodiment of the invention, the slider plate may be omitted altogether where the electromagnet 12 itself comprises a set of lugs, ears, tabs or projections that can engage, in use, with the slider plate receiving channels 48.

Figure 9:
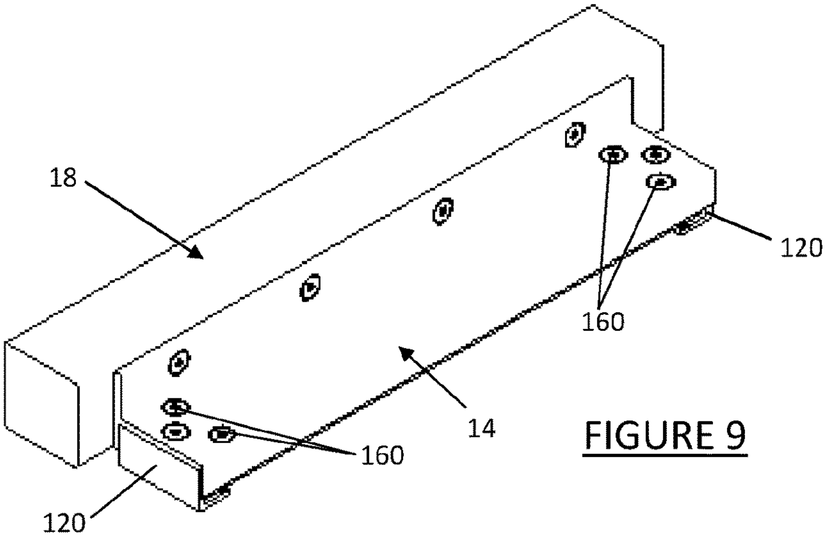
FIG. 9 is a perspective view of a second embodiment of an adjustable mounting assembly according to the invention.
Figure 10:
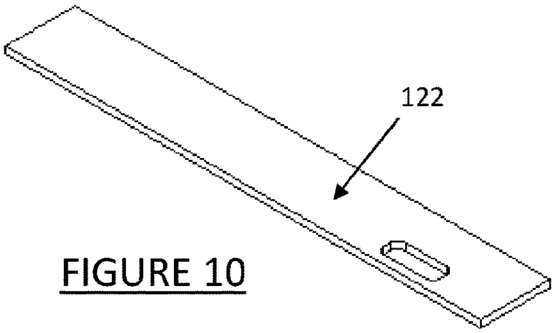
FIG. 10 is a perspective view of an alternative sliding plate for the second embodiment.

An alternative embodiment of the invention is shown in FIGS. 9, 10 and 11 of the drawings and identical reference signs have been used to identify identical features for the sake of convenience and to avoid repetition.

The main differences between the second embodiment of the invention and the first, described above, are the location of the locking screws 160, which enter the device from above, i.e. out of view when most applications, rather than from below, as is the case with the locking screws 60 previously described; and the outline of the sliding plate 122, which is rectangular, i.e. not having the cut-outs 58 previously described, which facilitates manufacturing the sliding plate 122.

The slider plate receivers 120 are slightly modified in the second embodiment inasmuch as a pair of through holes 102 are provided to enable the shanks 102 of the locking screws 160 to extend through the receivers 120 to engage the sliding plate 122, as can be best seen in FIGS. 11 and 11A of the drawings. In FIG. 11, it will be noted that the through holes 102 for the sliding plate locking screws 160 are located inboard of the free ends 106 of the tab 108 forming the lower surface of the slider plate receiving channels 48. Thus, by tightening the locking screws 160, the slider plate is deformed (as shown exaggeratedly in FIG. 11) such that its underside engages the ribbing 50 provided inside the slider plate receiving channel 48 and the free end 106 of the tab 108.

In FIG. 11A, a similar arrangement is shown, except this time the locking screw 160 is inserted into the other one 42 of the captive nut channels 42, 43. In this case, the receiver is connected to the main body by screw in the opposite channel 43. Nevertheless, it can be seen (exaggerated in the drawing) that by tightening the locking screw 160, the slider plate 122 is deformed, thereby retaining it in location by the frictional engagement of the locking screw 160 with the slider plate 122 as well as by the mechanical interference of the deformed slier plate 122 in the slider plate receiving channel 48.

In the alternative embodiment of FIGS. 9 to 11, the slider plate deforms in a different orientation to that shown in the first embodiment, that is to say, in the length direction of the slider plate 122, as opposed to in the width direction (as shown in FIG. 8).

There are two locking screws 160 and this conveniently provides a greater range of movement for the slider plate 122 relative to the receivers 120 as one, or both locking screws (of each pair) can be used to grip the slider plate 122 depending on whether it is roughly in-line with the main body portion 14, or moved to either side thereof.

A further aspect of the invention subsists in an electromagnet comprising a set of lugs, ears, tabs or projections adapted to engage with, in use, the slider plate receiving channels of the assembly described herein.

An alternative embodiment of the invention is shown in FIG. 12 of the drawings in which the electromagnet 12 described previously has been replaced by an electromagnetic striker 200. The mounting assembly 10 is otherwise as shown in FIGS. 6 & 7.

The striker 200 differs from the electromagnet 12 of the preceding embodiment inasmuch as rather than having a single electromagnet arranged to face towards the door, the electromagnetic striker 200 comprises an electromagnet (not visible) facing downwardly, in use (upwardly in the drawing). The electromagnet of the striker 200 is arranged to cooperate with a pair of pivotally mounted latches 210, which each comprise a ferromagnetic (e.g. steel) land 216 that is attracted to the electromagnet (not visible), when activated. The latches each further comprise an upstand portion 217, which has a flat inner surface, which engages, in use, a catch of a door (not shown) and a curved outer surface 219. The latches 210 are arranged to pivot about an axis 231 such that when the electromagnet (not visible) is deactivated, the latches 210 are able to pivot about axis 231 to release the catches (not shown), thus permitting a door to open.

In the illustrated embodiment, the electromagnetic striker 200 comprises two latches 210, and this permits a single unit to be positioned above the intersection of a set of double doors.

To accomplish this, the faceplate 218 of the striker unit 200 comprises a pair of recesses 220 within which the latches 210 are recessed.

As previously described, the cabling 13 for the electromagnet 12 can be routed discretely within the mounting assembly and the door frame.

In use, a corresponding door catch aligns with the strike recess 220 to engage the upstand 217 of the latch 216 and is electromagnetically locked. When the electromagnet is deactivated, the lock is released enabling the latches 216 to rotate about axis 231 to release the catches allowing the door to open. After the catch has been released, the latches 216 spring back under the action of an internal spring.

One possible advantage of the embodiment shown in FIG. 12 of the drawings is that it enables a single electromagnetic locking system to be used for a set of double doors. This may be particularly relevant where, say, the doors are fitted with sprung closing units leaving insufficient space for the fixing of two locks (e.g. as shown in FIGS. 1 to 7)—one for each door. Nevertheless, by virtue of the adjustability of the locking system, which is retained in the embodiment shown in FIG. 12, the striker can be accurately positioned and re-positioned, as per the preceding examples.

The invention is not restricted to the details of the foregoing embodiment, which is merely exemplary of the invention. The shape, configuration, materials and dimensions quoted or inferred, can be altered to suit different requirements.

The invention claimed is:

1. A mounting assembly for an electromagnet of an electromagnetic door locking system, the mounting assembly comprising:

a main body portion affixable, in use, to a door or to a door frame, the main body portion defining an elongated channel and a pair of apertures at each end of the main body portion;

a pair of slider plate receivers, each received at a respective end of the elongated channel, wherein each slider plate receiver comprises a pair of channels and a slider plate receiving channel;

a slider plate configured to mount the electromagnet and defining at least one tab at each end of the slider plate, wherein each tab of the slider plate is adapted to be received within a corresponding slider plate receiving channel of the slider plate receivers, and wherein a set of locking screws passing through the respective apertures on the main body portion and cooperating with the channels on the slider plate receivers, so that each slider plate receiver is capable of being adjustable with respect to the main body portion and being adapted, upon tightening, to deform the channels or tabs to clamp them to fix the electromagnet relative to the main body portion.

2. The mounting plate assembly of claim 1, wherein the main body portion is affixable, in use, to the door or door frame using screws that extend through apertures in the main body portion.

3. The mounting assembly of claim 1, wherein the main body portion comprises a hollow interior portion and suitably arranged cabling apertures.

4. The mounting assembly of claim 1, wherein the main body portion has a constant cross-section.

5. The mounting assembly of claim 1, further comprising a pair of slider plate receivers affixable, in use, to the main body portion, and wherein the channels are formed in the slider plate receivers.

6. The mounting assembly of claim 5, wherein the sliding plate receivers are affixable to opposite ends of the main body portion.

7. The mounting assembly of claim 5, wherein the sliding plate receivers comprise a constant cross-section.

8. The mounting assembly of claim 5, wherein the slider plate receivers comprise a channel adapted to accommodate one or more captive nuts.

9. The mounting assembly of claim 1, wherein the channels are located slightly below underside of the main body portion.

10. The mounting assembly of claim 1, further comprising a slider plate to which, in use the electromagnet is affixable.

11. The mounting assembly of claim 10, wherein the slider plate has a generally rectangular shape whose length corresponds to the distance between the inner edges of the channels.

12. The mounting assembly of claim 10, wherein the width of the slider plate corresponds to the width of the electromagnet and/or to the width of the main body portion.

13. The mounting assembly of claim 10, wherein the slider plate comprises an aperture through which, in use, cabling for the electromagnet can pass into the main body portion.

14. The mounting assembly of claim 1, wherein the tabs or the ends of the slider plate comprise a pair of U-shaped cut-outs.

15. The mounting assembly of claim 1, wherein the locking screws engage with a tapped orifice of the mounting assembly.

16. The mounting assembly of claim 15, wherein the taped orifice comprises a captive nut retained by a captive nut retaining channel of the mounting assembly.

17. The mounting assembly of claim 1, wherein the channels comprise ribbing.

18. A kit of parts comprising a mounting assembly according to claim 1 and an electromagnet.

19. The kit of claim 18, wherein the electromagnet comprises integrally formed tabs adapted to engage, in use, the channels of mounting assembly; and wherein the electromagnet is affixed to a slider plate to which the electromagnet is affixable.

20. The kit of claim 18 wherein the electromagnet is incorporated into an electromagnetic striker, and wherein the electromagnetic striker comprises an electromagnet adapted to cooperate with one or more pivotally mounted latches, the latches being moveable between a first locking position in which they are attracted to the energised electromagnet, and a second positon in which they are rotated relative to the first positon when the electromagnet is deactivated.

* * * * *